United States Patent
Lin et al.

(10) Patent No.: US 7,130,994 B2
(45) Date of Patent: Oct. 31, 2006

(54) METHOD OF BOOTING A COMPUTER TO PLAY A COMPACT DISC WITHOUT LOADING AN OPERATION SYSTEM

(75) Inventors: Jacky Lin, Kaohsiung (TW); Nan-Sheng Wang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 471 days.

(21) Appl. No.: 10/647,478

(22) Filed: Aug. 26, 2003

(65) Prior Publication Data

US 2004/0039904 A1 Feb. 26, 2004

(30) Foreign Application Priority Data

Aug. 26, 2002 (TW) .............................. 91119293 A

(51) Int. Cl.
*G06F 9/24* (2006.01)
(52) U.S. Cl. ........................................................ 713/1
(58) Field of Classification Search .................... 713/1, 713/2, 300, 320
See application file for complete search history.

(56) References Cited

U.S. PATENT DOCUMENTS

| | | | | |
|---|---|---|---|---|
| 6,006,285 A | * | 12/1999 | Jacobs et al. | 710/14 |
| 6,006,337 A | * | 12/1999 | Koo | 713/324 |
| 6,654,827 B1 | * | 11/2003 | Zhang et al. | 710/62 |
| 6,711,631 B1 | * | 3/2004 | Chan et al. | 710/14 |
| 6,792,480 B1 | * | 9/2004 | Chaiken et al. | 710/14 |
| 6,819,961 B1 | * | 11/2004 | Jacobs et al. | 700/17 |
| 6,865,621 B1 | * | 3/2005 | Iwata | 710/20 |
| 2004/0019811 A1 | * | 1/2004 | Tung | 713/300 |

FOREIGN PATENT DOCUMENTS

CN 1355474 A 6/2002

* cited by examiner

*Primary Examiner*—Thomas Lee
*Assistant Examiner*—Mark Connolly
(74) *Attorney, Agent, or Firm*—Birch, Stewart, Kolasch & Birch, LLP

(57) ABSTRACT

A method for booting a computer to play a compact disc without loading an operation system is provided. The computer has a first booting button and a second booting button. The first booting button is for booting the computer completely and loading the operation system normally. And the second booting button is for booting the computer incompletely to drive a part of devices of the computer thereof for playing a compact disc without loading the operating system. The method includes the steps of ascertaining whether a booting action is triggered by the second booting button, initializing the part of devices of the computer when the booting action is triggered by the second booting button, activating an optical disc drive to read the compact disc by pressing predetermined keys located on a general keyboard, and to play through a speaker.

5 Claims, 2 Drawing Sheets

METHOD OF BOOTING A COMPUTER TO PLAY A COMPACT DISC WITHOUT LOADING AN OPERATION SYSTEM

This Nonprovisional application claims priority under 35 U.S.C.§ 119(a) on Patent Application No(s) . 91119293 filed in Taiwan, R.O.C. on Aug. 26, 2002, the entire contents of which are hereby incorporated by reference.

FIELD OF THE INVENTION

The present invention relates to a method and a computer for playing audio CDs, and more specifically, to a method and a computer for playing the audio CDs when the computer is booted partially.

BACKGROUND OF THE INVENTION

With the continuing advances and developments of electrical manufactures, the multimedia computers in new generation with high quality are widely used and more popular. The expenditure enhancement for computers also causes the popularization and more vigorous development of peripheral products. These peripheral devices such as hard discs, optical disc drives, scanners, printers and so on are introduced to enhance and expand variety functions of computers for providing users more convenient applications.

The CD-ROM is a convenient and popular device due to the enormity storage capacity of the compact discs and further due to the data containing music or image formats can be long-term preserved. Especially, following the performance promotion of peripheral devices such as audio chips, speakers and etc., the computer can provide good tone quality when playing the audio CDs. Therefore, some users are used to listen to music or speech sounds via the computers.

However, because the optical disc drives are peripheral apparatus of computer systems, the users have to boot the computer system first to enter the environment of the operation system. And then the related playing programs are executed to drive the optical disc drives and audio chips for playing music and speech sounds. However, when users just want to listen to music and do not want to operate other programs, it is required to spend a lot of time for booting the computer to enter the operation system and execute the playing programs. Comparatively, the conventional CD player is more convenient for users because they just need to dispose a CD into the CD player and press the "PLAY" button for playing. Besides, when the booting sequence is done, all devices of the system are maintained in the stand-by state will cause extra electrical consumption.

For overcoming the above issues, in some current designs, the computer will enter to a low power consumption mode when it is applied to play audio CDs. Namely, except the required devices used for playing, other peripheral devices are suspended to a lower consumption mode for saving electrical power. However, it is still required to complete the whole booting sequences, and then to control the computer entering the lower consumption mode for the audio CDs playing function.

Besides, in some other designs, an extra hardware of "CD-ROM playing module" is assembled in the computer, and on the casing thereof a control panel for operating the CD-ROM drive is mounted to perform the "CD-ROM drive playing function" when the computer is not booted. The extra control panel comprises those typical functional buttons such as "PLAY", "STOP", "FORWARD", "BACKWARD", "EJECT",etc . . . .

It is noted that the aforementioned design also has many problems. First, there is a requirement to reserve some space in the computer casing for mounting wiring and hardware of the extra "CD-ROM playing module" therein. Especially, because these wiring and hardware are disposed onto the motherboard and assemblies of the computer casing, the users must buy the single brand of computer assembly to have the above playing function. In other words, for some userswho are used to assembling computers themselves, this will cause them losing the liberty of choosing the motherboard, optical disc drive, and computer casing from different brands. Additonally, due to the wiring and hardware are jointed onto the motherboard and computer casing by soldering, it is very difficult to assemble the "CD-ROM playing module" by the users themselves.

Further, some manufacturers try to change the design of keyboard, to have the functional buttons such as "PLAY", "STOP", "FORWARD", "BACKWARD", "EJECT", etc. mounted on the keyboard, or to have a specific keyboard controller and specific functional buttons defined by the manufacturers. However, the users must buy the specific keyboards, which are applied to substitute for the general keyboards, for controlling the "CD-ROM playing module". Namely the users also lose the liberty of choosing the brand or appearance of keyboards.

Except the above limitations of buying or assembling computers for users, the aforementioned "CD-ROM playing module" also causes prime cost increasing and lack of space because it is need to mount extra wiring and components. Thus the users have to pay more money for the CD-ROM playing function.

SUMMARY OF THE INVENTION

The prime objective of the present invention is to provide a method of playing audio CDs by activating a part of computer devices and without loading the operation system.

Another objective of the present invention is to provide a new BIOS to drive the optical disc drive, the audio chip, and the keyboard for playing audio CDs when the computer is booted incompletely.

A further objective of the present invention is to provide a design for activating the optical disc drive when the computer is booted partially. Thus the users do not need to buy any specific keyboard and can operate the optical disc drive by resetting the keys of a general keyboard.

The present invention provides a method for booting a computer to play a compact disc without loading an operation system. The computer has a first booting button and a second booting button, wherein the first booting button is for booting the computer completely and loading the operation system completely, and the second booting button is for booting the computer incompletely to drive a part of devices of the computer for playing a compact disc without loading the operating system. The method comprises the steps of ascertaining whether a booting action is triggered by the first booting button or the second booting button; initializing a part of motherboard devices and a part of peripheral devices when the booting action is triggered by the second booting button, wherein the part of the devices includes an audio chip, an optical disc drive and a general keyboard; and operating the optical disc drive to read a compact disc by pressing predetermined keys located on the general keyboard, and to play through a speaker.

Besides, the present invention also provides a BIOS which can be applied to drive an optical disc drive of a computer without loading an operating system. The BIOS comprises the following components. An initializing module is for identifying and initializing the optical disc drive and a general keyboard. A set of IDE instructions is for driving and controlling the optical disc drive to read data of a compact disc. A driver program is for driving and controlling an audio chip to receive and decode the data of the compact disc so as to play through a speaker. And a set of determining instructions is for receiving and recognizing signals triggered by predetermined keys located on the general keyboard to control the optical disc drive and the audio chip.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings, which are given by way of illustration only, and thus are not limitative of the present invention, and wherein.

DETAILED DESCRIPTION OF THE PREFERRED EMBODIMENT

Figure 1:
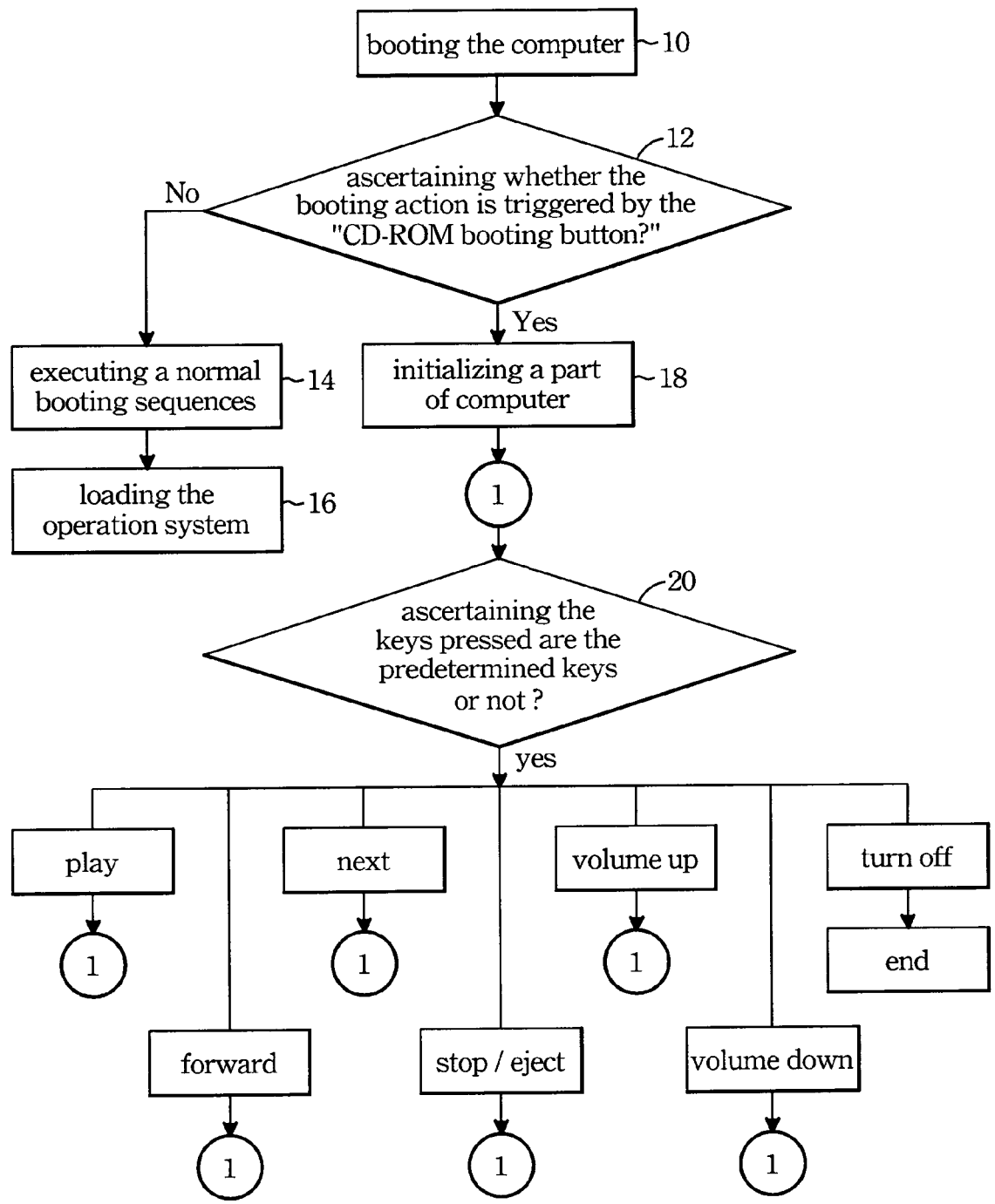
FIG. 1 illustrates the flow chart of the method of driving a optical disc drive for playing audio CDs when a computer is booted incompletely according to the present invention.

Please refer to FIG. 1, the flow chart illustrates the steps of booting a computer incompletely for playing a compact disc provided by the present invention. In the embodiment, two booting buttons are provided in the computer, one is the normal booting button maybe located on the control panel of a computer casing, and the other is the keyboard booting button located on a general, not specific, keyboard of the computer to provide users the convenience of booting the computer through the general keyboard. In the following embodiment, the keyboard booting button is applied to boot the computer incompletely for activating an optical disc drive to play a compact disc without loading an operation system.

Still referring to FIG. 1, according to the present invention, a "optical disc drive playing function" is activated by modifying the setting in a BIOS (basic input output system) device. The optical disc drive includes CD-ROM, CD-RW, DVD-ROM or the like. And after the "optical disc drive playing function" is activated, the "keyboard booting button" is redefined for booting the computer partly and driving a part of devices of the computer to allow the optical disc. And then reboot the computer to intitialize a part of devices of the computer for perfoming the play function. The part of devices comprises an audio chip, the optical disc drive and the keyboard. On the contrary, when the "optical disc drive playing function" is cancelled, the keyboard booting button is returned to the original booting function. It is noted that though only the keyboard booting button is applied to serve as "optical disc drive booting button" in this embodiment, however, in practice, many means can be applied to substitute for the keyboard booting button to trigger the "optical disc drive playing function". For example, the control panel of the computer casing can be designed to have an extra "optical disc drive booting button" thereon.

Still referring to FIG. 1, according to the present invention, a "optical disc drive playing function" is activated by modifying the setting in a BIOS (basic input output system) device. The optical disc drive includes CD-ROM, CD-RW, DVD-ROM or the like. And after the "optical disc drive playing function" is activated, the "keyboard booting button" is redefined for booting the computer partly and driving a part of devices of the computer to allow the optical disc drive playing a compact disc. And then reboot the computer to initialize a part of devices of the computer for performing the play function. The part of devices comprises an audio chip, the optical disc drive and the keyboard. On the contrary, when the "optical disc drive playing function" is cancelled, the keyboard booting button is returned to the original booting function. It is noted that though only the keyboard booting button is applied to serve as "optical disc drive booting button" in this embodiment, however, in practice, many means can be applied to substitute for the keyboard booting button to trigger the "optical disc drive playing function". For example, the control panel of the computer casing can be designed to have an extra "optical disc drive booting button" thereon.

Still referring to FIG. 1, when the user triggers the "normal booting button" or the "keyboard booting booting" to activate a booting action of the computer (step 10), the BOIS will ascertain whether the booting action is triggered by the "keyboard booting button" (namely the "optical disc drive playing button") or the "normal booting button" (step 12). When the "booting action" is triggered by the "normal booting button"(the first button), the BIOS will execute the normal booting sequences (step 14) and thus the operating system (OS) will be loaded completely (step 16). On the contrary, when the "booting action" is triggered by the "optical disc drive playing button" (the second button), then the BIOS will initialize a part of the computer, including a part of devices on the motherboard and a part of peripheral devices (step 18) without loading the OS to have the computer booted partly.

Still referring to FIG. 1, during step 18, the devices of the motherboard initialized by the BIOS comprise an audio chip mounted on the motherboard at least. Additionally, the peripheral devices initialized include the optical disc drive (ODD) and the general keyboard. Thus, the user can operate the optical disc drive to read a compact disc by pressing predetermined keys located on the general keyboard and to playing through the audio chip and a speaker. In general, the users have to predetermine the keys of "the optical disc drive playing function" firstly, and then they can use these predetermined keys to operate the optical disc drive after the computer is booted partly. In other words, the computer booted incompletely will ascertain the keys pressed by the users are the predetermined keys or not (step 20), to have the functions such as "play", "forward", "next", "stop/eject", "volume up", "volume down" and "turn off".

As mentioned above, when the computer executes the "optical disc drive playing function" of the present invention, the OS is not loaded, and only a part of motherboard devices and peripheral devices are initialized to have the computer partially booted. Please refer to FIG. 2, when the BIOS 30 determine the booting action is triggered by the "optical disc drive playing button" (hereinafter "ODD playing button" for short), a south bridge chip 32, a north bridge chip 34 and a central processing unit (CPU) 36 are initialized and maintained in the partial working condition. Then the BIOS 30 can initialize a general keyboard 38, an optical disc drive 40 and an audio chip 42 through the south bridge chip 32 to recognize and adjust the working conditions of these devices.

When the general keyboard 38 is initialized, a keyboard host controller in the south bride chip 32 will reset a keyboard device controller in the general keyboard 38. After the reset, the keyboard device controller can receive triggering signals from the general keyboard 38. When the keys are pressed, the keyboard device controller will inform the keyboard host controller in the south bridge chip 32 via a breaking manner and notify the CPU 36.

After the initializing procedures, the users can use the keyboard 38 to control and operate the optical disc drive 40 for reading data in a compact disc. And the data can be played through an audio chip 42 and a speaker 44. Namely, when the keys on the general keyboard 38 are pressed, the CPU 36 will control the optical disc drive 40 to read the data of the compact disc according to the IDE instructions stored in the BIOS 30, and control the audio chip 42 according to the driving program stored in the BIOS. It is noted that in a preferred embodiment the BIOS 30 can also initialize the hardware monitor chip 46 on the motherboard for preventing the motherboard devices from damage. Then, the hardware monitor chip 46 can drive and adjust the rotation speed of a fan 48 basing on the working condition of the CPU 36 for cooling it.

Figure 2:
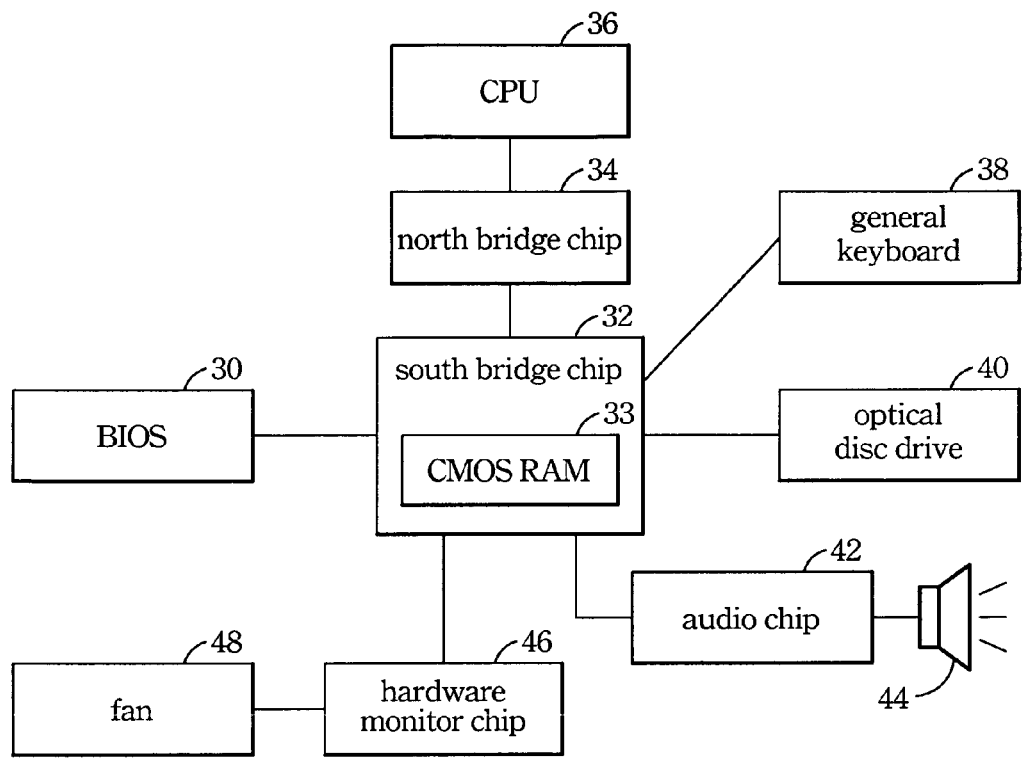
FIG. 2 illustrates the functional blocks of partial motherboard devices and peripheral devices which are initialized for performing the "CD-ROM playing function" of the present invention.

Even though in FIG. 2, the BIOS 30 is connected directly to the south bridge chip 32, however, in some motherboard designs, a super input output chip (SIO) is provided And the aforementioned BIOS 30, the fan 48 and the keyboard 38 are connected to the south bridge chip 32 through the SIO chip. Under this condition, the BIOS 30 also initializes the SIO chip to have it in the partial working condition. Besides, for the south bridge chip 32 and the audio chip 42 connected together, according to the specification of the audio chip 42, an AC 97 bus or a PCI interface bus can be chosen.

Figure 3:
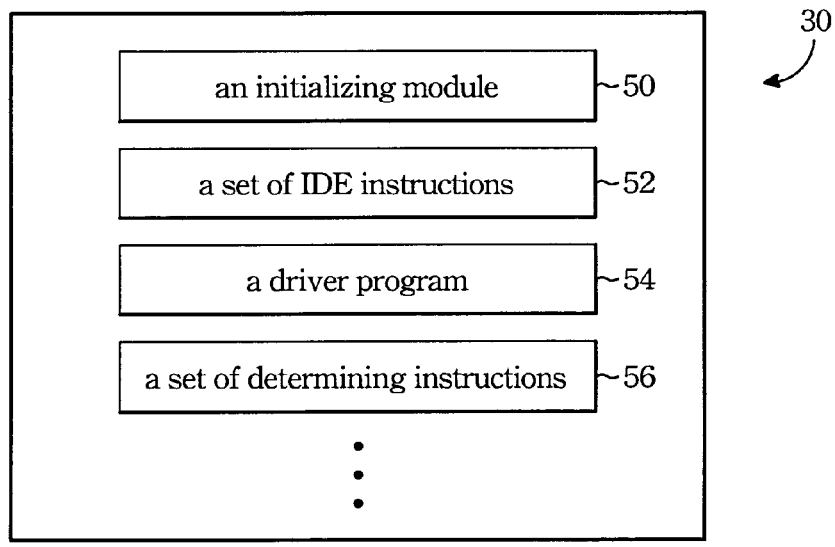
FIG. 3 illustrates the functional blocks of modules and programs extra introduced into the BIOS according to the present invention.

For initializing and setting the required devices smoothly when the computer is only booted partly and without loading the OS, besides the booting codes, the decompressed codes, the POST module and the Run-Time module, the BIOS 30 in the present invention further comprises a module for driving the optical disc drive, the audio chip and the general keyboard. Please refer to FIG. 3, the BIOS 30 comprises an initializing module 50 for identifying and initializing the optical disc drive and the general keyboard, a set of IDE instructions 52 for driving and controlling the optical disc drive to read the data of the compact disc, a driver program 54 for driving and controlling the audio chip to receive and decode the data of the compact disc so as to play through a speaker, and a set of determining instructions 56 for receiving and recognizing signals triggered by predetermined keys located on the general keyboard to control the optical disc drive and the audio chip.

For providing the users the convenience of applying the "CD-ROM playing function" of the present invention, when the users want to activate it, they can boot the computer completely to enter a BIOS configuration first, and then pick up the item of "activating CD-ROM playing function". By choosing the related items, the users also can redefine the keyboard keys to determine the functions thereof for controlling the optical disc drive basing on their favors. For example, the "P" key can be set to serve as the "PLAY" key; the "F" key can be set to be the "NEXT" key; the "B" key can be set to be the "PREVIOUS" key; the "S" key can be set to be the "STOP" key; and the "E" key can be set to be the "EJECT" key, etc . . . . If the users do not want to redefine the key function, they still can operate the optical disc drive according to the default setting. Both the "default key setting" and the "redefining key setting" modified by the users are stored in a CMOS RAM 33 of the south bridge chip 32 (referring to FIG. 2). Namely, when the users press the keys on the general keyboard, the CPU 36 will recognize and execute the functions of the optical disc drive according to the key setting stored in the CMOS RAM 33.

Besides, for the convenience of affirming the operation state of the optical disc drive, the LEDs located on the general keyboard can be applied to illustrate the operation state of the optical disc drive. Generally, on a typical keyboard there are three indicators, LED1, LED2 and LED3, for individually illustrating the states of "Num Lock", "Caps Lock" and "Scroll Lock". By arranging these three indicators, the whole operation states of the optical disc drive can be illustrated. For example, when the optical disc drive is in the "PLAYING" state, the three indicators flash in order repeatedly; when the optical disc drive stops playing, only the LED3 indicator is bright; when the users choose the "PREVIOUS" function, the LED1 indicator flashes three times; and when the users choose the "NEXT" function, the LED2 indicator flashes three times, etc . . . .

The method for partial booting a computer to play and play a compact disc provided in the present invention have many advantages:

The optical disc drive of the computer can be applied to play audio CDs without loading the OS by using the design of the present invention. And because it is not required to introduce extra hardware and circuits, the cost can be reduced.

Because the computer is booted partially when the "optical disc drive playing function" is performed, only the required devices are powered on to have the playing performance, and thus the power consumption can be lowered.

Because there is no requirement to introduce extra hardware and bus lines, the users, they do not have to buy a specific brand of computer for playing audio CDs, and can still possess liberty to assemble their desktops with the "CD-ROM playing function".

Because the "CD-ROM, playing function" of the present invention is executed by the keys of the keyboard set by users themselves, it is not required to buy a specific keyboard. And the original general keyboards can be applied to perform the "optical disc drive playing function".

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar design.

What is claimed is:

1. A method for modifying the setting in a BIOS device to activate the optical disc drive playing function and to boot the computer incompletely for operating an optical disc drive, said method comprising the steps of:
   entering a BIOS configuration of said computer;
   activating playing function of an optical disc drive to allow said optical disc drive playing a compact disc without loading an operating system and when said computer is booted incompletely;

rebooting said computer to initialize a part of devices of said computer for performing said play function, wherein said part of devices comprise an audio chip, said optical disc drive and said keyboard; and operating said optical disc drive to read data of a compact disc by triggering said part of said keys located on said keyboard.

2. The method of claim 1, wherein said computer defines a booting button located on said keyboard as an optical disc drive booting button after said step of activating said play function of optical disc drive.

3. The method of claim 2, wherein said computer is booted incompletely by triggering said optical disc drive booting button.

4. The method of claim 1, wherein said step of initializing said audio chip is performed by loading a driver program stored in a BIOS of said computer.

5. The method of claim 1, wherein a set of 111DB instructions stored in a BIOS is executed for controlling and operating said optical disc drive after said step of initializing said optical disc drive.

* * * * *